US012470861B2

(12) United States Patent
Van Noort et al.

(10) Patent No.: US 12,470,861 B2
(45) Date of Patent: Nov. 11, 2025

(54) MICROPHONE UNIT ARRANGED ON TOP OF RECEIVER UNIT NOZZLE

(71) Applicant: Sonion Nederland B.V., Hoofddorp (NL)

(72) Inventors: Friso Van Noort, Hoofddorp (NL); Raymond Mogelin, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 204 days.

(21) Appl. No.: 18/042,271

(22) PCT Filed: Jul. 20, 2021

(86) PCT No.: PCT/EP2021/070285
§ 371 (c)(1),
(2) Date: Feb. 20, 2023

(87) PCT Pub. No.: WO2022/042951
PCT Pub. Date: Mar. 3, 2022

(65) Prior Publication Data

US 2023/0300514 A1 Sep. 21, 2023

(30) Foreign Application Priority Data

Aug. 26, 2020 (DK) ........................... PA 2020 70553

(51) Int. Cl.
*H04R 1/10* (2006.01)
*H04R 1/34* (2006.01)
*H04R 25/00* (2006.01)

(52) U.S. Cl.
CPC ......... *H04R 1/1075* (2013.01); *H04R 1/1016* (2013.01); *H04R 1/342* (2013.01); *H04R 25/604* (2013.01); *H04R 25/654* (2013.01)

(58) Field of Classification Search
CPC .. H04R 1/2896; H04R 1/1075; H04R 1/1016; H04R 1/08; H04R 19/04; H04R 1/1041;
(Continued)

(56) References Cited

U.S. PATENT DOCUMENTS 4,291,203 A 9/1981 Bellafiore
2006/0239485 A1 10/2006 Niederdrank
(Continued)

FOREIGN PATENT DOCUMENTS

CH 684231 A5 7/1994
CN 2435886 Y 6/2001
(Continued)

OTHER PUBLICATIONS

International Search Report for International Application No. PCT/EP2021/070285 dated Oct. 22, 2021.
(Continued)

*Primary Examiner* — Carolyn R Edwards
*Assistant Examiner* — Julie X Dang
(74) *Attorney, Agent, or Firm* — Harness, Dickey & Pierce, P.L.C.

(57) ABSTRACT

The present invention relates to an acoustical assembly adapted to be inserted into an ear canal, said acoustical assembly comprising a receiver unit adapted to generate sound pressure waves, a microphone unit adapted to detect sound pressure waves inside the ear canal when the acoustical assembly is inserted in the ear canal, and a nozzle comprising a receiver unit mount adapted to house at least part of the receiver unit, wherein the nozzle comprises at least one sound channel adapted to guide generated sound pressure waves from a receiver unit outlet to at least one sound outlet opening of the nozzle, and wherein the nozzle further comprises a microphone unit mount adapted to house at least part of the microphone unit. The present invention
(Continued)

further relates to a hearing device comprising an acoustical assembly.

15 Claims, 5 Drawing Sheets

(58) Field of Classification Search
CPC .............. H04R 19/016; H04R 2410/03; H04R 2201/003; H04R 19/005; H04R 1/342; H04R 25/604; H04R 25/654; A61B 5/6817; A61B 5/125; A61B 2562/028; A61B 2562/0204
USPC ................................ 381/370, 300, 376, 380
See application file for complete search history.

(56) References Cited

U.S. PATENT DOCUMENTS

| | | | | |
|---|---|---|---|---|
| 2007/0160243 | A1* | 7/2007 | Dijkstra | H04R 25/00 381/328 |
| 2008/0107287 | A1 | 5/2008 | Beard | |
| 2008/0181440 | A1* | 7/2008 | Saltykov | H04R 1/345 381/328 |
| 2009/0052710 | A1 | 2/2009 | Smith | |
| 2011/0103605 | A1* | 5/2011 | Killion | H04R 1/1083 381/72 |
| 2016/0324478 | A1 | 11/2016 | Goldstein | |
| 2017/0048608 | A1* | 2/2017 | Yang | H04R 1/1016 |
| 2017/0094422 | A1* | 3/2017 | Margot | H04R 25/604 |
| 2017/0188128 | A1 | 6/2017 | Cheng et al. | |
| 2018/0098146 | A1 | 4/2018 | Lin et al. | |
| 2018/0249261 | A1 | 8/2018 | Wichmann et al. | |
| 2019/0208301 | A1 | 7/2019 | Monti et al. | |
| 2020/0077211 | A1 | 3/2020 | Wichmann et al. | |
| 2021/0160627 | A1* | 5/2021 | Dominijanni | H04R 25/652 |

FOREIGN PATENT DOCUMENTS

| | | | |
|---|---|---|---|
| CN | 2829265 | Y | 10/2006 |
| CN | 104041077 | A | 9/2014 |
| CN | 104254028 | A | 12/2014 |
| CN | 108513242 | A | 9/2018 |
| CN | 210609653 | U | 5/2020 |
| EP | 2134107 | B1 | 9/2013 |
| EP | 2795923 | B1 | 11/2015 |
| EP | 3313097 | A1 | 4/2018 |
| EP | 3422734 | B1 | 5/2020 |
| WO | 00/42817 | A1 | 7/2000 |
| WO | 2005/076991 | A2 | 8/2005 |
| WO | WO-2016/098382 | A1 | 6/2016 |
| WO | 2019/052714 | A1 | 3/2019 |

OTHER PUBLICATIONS

Written Opinion for International Application No. PCT/EP2021/070285 dated Oct. 22, 2021.
International Preliminary Report on Patentability for International Application No. PCT/EP2021/070285 dated Dec. 7, 2022.
Danish Search Report for Danish Application No. PA202070553 dated Mar. 2, 2021.
Written Opinion of the International Preliminary Examining Authority for International Application No. PCT/EP2021/070285 dated Jun. 17, 2022.
Chinese Office Action May 1, 2024 issued in corresponding Chinese Appln. No. 202180052426.X (with partial English translation).
European Communication of a Notice of Opposition dated Jun. 17, 2025 for corresponding European Application No. 21748557.2.

* cited by examiner

MICROPHONE UNIT ARRANGED ON TOP OF RECEIVER UNIT NOZZLE

CROSS-REFERENCE TO RELATED APPLICATIONS

This application is a national phase under 35 U.S.C. § 371 of PCT International Application No. PCT/EP2021/070285 which has an International filing date of Jul. 20, 2021, which claims priority to Danish Patent Application No. PA 2020 70553, filed Aug. 26, 2020, the entire contents of each of which are hereby incorporated by reference.

FIELD OF THE INVENTION

The present invention relates to an acoustical assembly adapted to be inserted into an ear canal, said acoustical assembly comprising a receiver unit adapted to generate sound pressure waves, a microphone unit adapted to detect sound pressure waves inside the ear canal when the acoustical assembly is inserted in the ear canal, and a nozzle comprising a receiver unit mount adapted to house at least part of the receiver unit, wherein the nozzle comprises at least one sound channel adapted to guide generated sound pressure waves from a receiver unit outlet opening to at least one sound outlet opening of the nozzle. In particular, the present invention relates to an acoustical assembly comprising a receiver unit and a microphone unit secured to a nozzle in an in line arrangement.

BACKGROUND OF THE INVENTION

Various combinations of receivers and microphones have been used in relation to hearing devices, i.e. hearing aids/hearables, earbuds and the like. The role of the microphone is to detect the sound pressure level generated by the receiver in the ear canal. By detecting the sound pressure level with the microphone the sound pressure level generated by the receiver in the ear canal can be monitored and limited.

Typical combinations of receivers and microphones are for example discussed in prior art references US 2008/0107287 A1 and US 2008/0181440 A1. These references both discuss in line implementations of receiver/microphone arrangements where the microphones are arranged in line with the respective receivers. When inserted into the ear canal the microphones are positioned closer to the ear drum than the respective receivers.

The in line arrangements suggested in both US 2008/0107287 A1 and US 2008/0181440 A1 appear disadvantageous in that the positioning, and in particular the orientation, of the microphones (with their sound inlets facing the ear drum) makes them vulnerable to, for example, ear wax, moisture or other undesired objects being present in the ear canal. In particular, moisture from the ear canal may potentially enter the microphone and thus damage it due to electrical short circuiting, whereas ear wax may potentially block the sound inlet opening of the microphone.

It may thus be seen as an object of embodiments of the present invention to provide a receiver/microphone arrangement where the microphone is less vulnerable and thus protected against for example ear wax and moisture while still being positioned close to the ear drum in the ear canal.

It may be seen as a further object of embodiments of the present invention to provide a receiver/microphone arrangement with an improved fit rate.

DESCRIPTION OF THE INVENTION

The above-mentioned object is complied with by providing, in a first aspect, an acoustical assembly adapted to be inserted into an ear canal, said acoustical assembly comprising

- a receiver unit adapted to generate sound pressure waves,
- a microphone unit adapted to detect sound pressure waves inside the ear canal when the acoustical assembly is inserted in the ear canal, and
- a nozzle comprising a receiver unit mount adapted to house at least part of the receiver unit, wherein the nozzle comprises at least one sound channel adapted to guide generated sound pressure waves from a receiver unit outlet opening to at least one sound outlet opening of the nozzle wherein the nozzle further comprises a microphone unit mount adapted to house at least part of the microphone unit.

The acoustical assembly of the present invention is advantageous in that the mutual positioning of the at least one sound outlet opening, the receiver unit mount and the microphone unit mount form, in combination, an elongated structure which improves the fit rate of the overall acoustical assembly.

Preferably, the microphone unit is arranged in the microphone unit mount in such a way that a sound inlet opening of the microphone unit is oriented towards an interior portion of the microphone unit mount of the nozzle. This is advantageous in that the orientation of the microphone unit prevents that ear wax, moisture or other undesired objects block the sound inlet opening of the microphone unit or damage the microphone unit.

The acoustical assembly of the present invention is further advantageous due to its simple design where a receiver unit and a microphone unit are attached to the same nozzle in an in line arrangement. Preferably, the at least one sound outlet opening of the nozzle is arranged between the receiver unit mount and the microphone unit mount. The simple design also facilitates that different receiver units and different microphone units may be combined. Further, the sound inlet of the microphone unit and the sound outlet of the receiver unit are spatially separated which makes it less susceptible to acoustic leaks.

In the present context a receiver unit is to be understood as a unit being capable of generating sound pressure waves, such as audio sound, in response to an electrical drive signal applied thereto. The receiver unit may be a moving armature type receiver unit. A microphone unit is to be understood as a unit being capable of detecting sound pressure waves, such as audio sound, and generate an electrical signal in response thereto. The microphone unit may be a MEMS microphone unit, an electret microphone, or a microphone comprising a biased membrane.

As addressed above, the microphone unit is arranged in the microphone unit mount in such a way that its sound inlet opening is oriented towards, i.e. facing, an interior portion of the microphone unit mount of the nozzle. Thus, the sound inlet opening of the microphone unit is not oriented towards the ear drum or the ear canal. Instead the sound inlet opening of the microphone unit faces the nozzle which is advantageous in that this orientation prevents, as mentioned above, that ear wax, moisture or other undesired objects blocking the sound inlet opening of the microphone unit or damage the microphone unit.

Preferably, the nozzle defines a longitudinal centre axis, and the receiver unit and the microphone unit preferably are arranged along said longitudinal centre axis. In this manner the overall shape of the acoustical assembly may become a longitudinal structure that fits easily into a typical ear canal. Preferably, the receiver unit and the microphone unit are arranged symmetrically around, and in line with, said longitudinal centre axis.

As already mentioned, the microphone unit is arranged in the microphone unit mount in such a way that its sound inlet opening is oriented towards, (or facing), an interior portion of the microphone unit mount of the nozzle. In order to facilitate this advantageous orientation of the microphone unit, the microphone unit mount of the nozzle preferably comprises an indentation into which indentation the microphone unit is at least partly arranged. The microphone unit may thus be arranged in the indentation with its sound inlet opening facing the bottom surface of the indentation. As already addressed the role of the microphone unit is to detect the sound pressure level generated by the receiver in the ear canal. In order to fulfil this role the microphone unit mount preferably comprises at least one sound channel adapted to guide sound pressure waves from the ear canal to the sound inlet opening of the microphone unit, although the sound inlet opening is oriented away from the ear canal.

The acoustical assembly preferably comprises a wax protection member adapted to be attached to the microphone unit mount of the nozzle. Preferably this wax protection member is replaceable. The wax protection member preferably is attached to the microphone unit mount via a user friendly click-on locking mechanism. This click-on locking mechanism is advantageous in that it allows the wax protection member as well as the microphone unit be easily attached to, or easily detached from, the microphone unit mount. The wax protection member is adapted to prevent that ear wax from the ear canal reaches the sound inlet opening of the microphone unit.

Thus, the role of wax protection member is to prevent that ear wax blocks the sound inlet opening of the microphone unit which may increase the life span of the microphone unit. Moreover, the wax protection member is adapted to maintain the microphone unit in a fixed position relative to the microphone unit mount of the nozzle. The wax protection member preferably comprises at least one sound inlet opening adapted to be aligned with the at least one sound channel of the microphone unit mount. The dimensions of the at least one sound inlet opening of the wax protection member may be smaller than the corresponding dimensions of the at least one sound channel of the microphone unit mount. The at least one sound inlet opening of the wax protection member may then act as a spatial filter or mesh for ear wax or other undesired objects.

The at least one sound outlet opening of the nozzle preferably is arranged between the receiver unit mount and the microphone unit mount. In particular, the at least one sound outlet opening of the nozzle may be arranged between the receiver unit mount and the microphone unit mount though closest to the microphone unit mount.

The number of sound outlet openings in the nozzle may be chosen to meet specific demands. Thus, preferably, a single sound outlet opening of the nozzle is arranged between the receiver unit mount and the microphone unit mount. Alternatively, a pair of oppositely arranged sound outlet openings may be arranged between the receiver unit mount and the microphone unit mount.

Preferably, the acoustical assembly further comprises a dome-shaped positioning member adapted to ensure correct positioning of the acoustical assembly in the ear canal. Preferably this dome-shaped positioning member is replaceable. Preferably this dome-shaped positioning member is flexible. The dome-shaped positioning member may be attached to the nozzle at a position between the receiver unit mount and the microphone unit mount. By dome-shaped is meant that the positioning member may take the shape of a part of a dome. The flexibility of the dome-shaped positioning member is advantageous in that the positioning member may then, due to its flexibility, adapt to the shape and contours of almost any ear canal and thus minimise undesired acoustical leakage. Moreover, the dome-shaped positioning member is symmetrical around the longitudinal centre axis so the acoustical performance of the acoustical assembly is insensitive to rotations of the acoustical assembly around the longitudinal centre axis. The acoustical assembly may further comprise a deflection member at least partly surrounding the microphone unit mount. The deflection member is preferably replaceable. Preferably this deflection member is flexible. The dome-shaped positioning member and the deflection member preferably form a one-piece structure of the same, preferably flexible material, such as silicone.

The one-piece structure may comprise at least one sound outlet opening aligned with the at least one sound outlet opening of the nozzle, and at least one sound inlet opening for the microphone unit. The at least one sound inlet opening for the microphone unit is preferably arranged through the deflection member. Alternatively, the at least one sound inlet opening for the microphone unit may be arranged between the positioning member and the deflection member, such as immediately beneath the deflection member.

In a second aspect the present invention relates to a hearing device comprising an acoustical assembly according to the first aspect.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be described in further details with reference to the accompanying figures where.

DETAILED DESCRIPTION OF THE INVENTION

As already discussed, the present invention relates to an acoustical assembly comprising a receiver unit and a nozzle (or spout) secured thereto. Moreover, a microphone unit is secured to the nozzle in such a way that its sound inlet opening is oriented towards, i.e. facing, the interior of the nozzle in order to prevent that ear wax, moisture or other undesired objects block the sound inlet opening of the microphone unit or damage the microphone unit.

Figure 1:
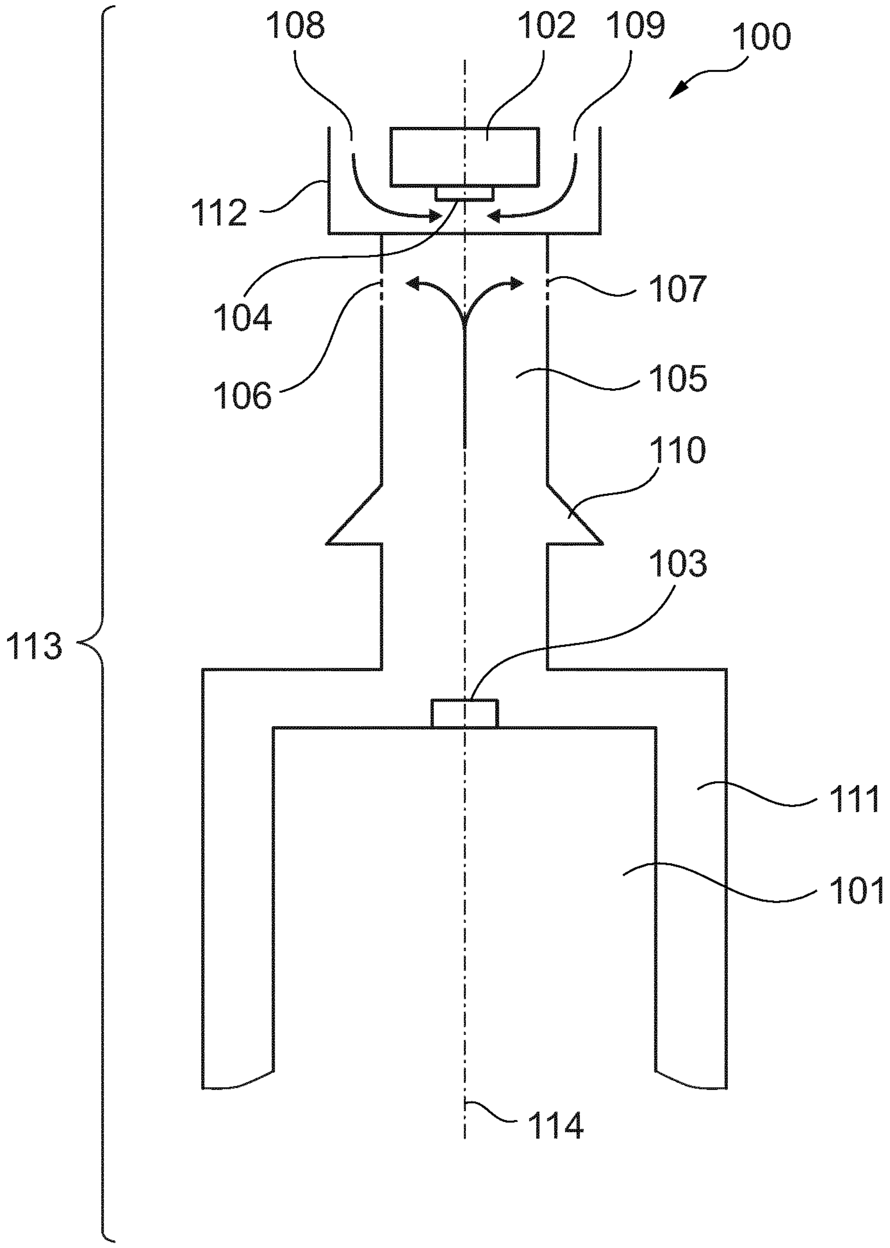
FIG. 1 shows a cross-sectional schematic view of an acoustical assembly comprising a receiver unit, a nozzle and a microphone unit arranged in line.

Referring now to FIG. 1, a cross-sectional schematic view of an acoustical assembly 100 comprising a receiver unit 101, a nozzle 113 comprising three portions 105, 111, 112 and a microphone unit 102 is depicted. The receiver unit 101 comprises a sound outlet opening 103 through which opening 103 sound pressure waves escape the receiver unit 101. The receiver unit 101 is adapted to generate sound within the audible range in response to a provided drive signal. Similarly, the microphone unit 102 comprises a sound inlet opening 104 through which opening 104 incoming sound pressure waves enter the microphone unit 102. The microphone unit 102 provides an electrical output signal in response to detected sound pressure waves. The receiver unit 101 and the microphone unit 102 are arranged in line with each other, i.e. along the imaginary longitudinal centre line 114.

The nozzle (or spout) 113 comprises three portions—a first portion 111 comprising a receiver unit mount for housing at least part of the receiver unit 101, a second portion 112 comprising a microphone unit mount for housing at least part of the microphone unit 102 and a third portion 105 connecting the first and second nozzle portions 111, 112. The third nozzle portion 105 comprises at least one sound channel adapted to guide generated sound pressure waves from the sound outlet opening 103 of the receiver unit 101 to at least one sound outlet opening 106, 107 of the nozzle 113 as indicated by the arrows. Possible implementations of the at least one sound channel within the third nozzle portion 105 will be discussed in further details in relation to FIGS. 4 and 5.

The three nozzle portions 105, 111, 112 are preferably manufactured as a one-piece structure, such as a moulded one-piece structure.

The second nozzle portion 112 comprises a microphone unit mount in the form of an indentation into which a least part of the microphone unit 102 is arranged. As depicted in FIG. 1 the sound inlet opening 104 of the microphone unit 102 faces, or is oriented towards, the interior of the nozzle 113 in order to prevent that ear wax, moisture or other undesired objects block or damage the microphone unit 102. Incoming sound pressure waves thus enter the sound channels 108, 109 (free space regions) between the microphone unit 102 and the indentation before reaching the sound inlet opening 104 as indicated by the two arrows. Electrical signals to and from the microphone unit 102 are provided via electrical wires through the third nozzle portion 105.

Retaining members 110 may optionally be arranged on an exterior surface of the third nozzle portion 105. Such retaining members 110 may be used for securing a positioning member (not shown), such as a dome, to the third nozzle portion 105.

Turning now to FIGS. 2*a* and 2*b*, two three-dimensional views of an acoustical assembly according to the present invention are depicted. As seen in FIG. 2*a*, the receiver unit 201 is inserted into the first portion 203 of the nozzle, whereas the second portion 207 of the nozzle houses the microphone unit 202. A, preferably replaceable, wax protection member 206 is secured to the second portion 207 of the nozzle. The wax protection member 206 is adapted to secure the microphone unit 202 to the second portion 207 of the nozzle, and protect the microphone unit 202 against ear wax.

As seen from the top view of FIG. 2*b* the wax protection member 206 comprises sound inlet openings 208, 209 which are aligned with respective sound channels (not shown) of the second portion 207 of the nozzle in order to guide incoming sound pressure waves to a sound inlet opening (not shown) of the microphone unit 202. Returning now to FIG. 2*a* the nozzle further comprises a retaining member 204 and oppositely arranged sound outlet openings 205 (only one opening is visible) for the receiver unit 201. The oppositely arranged sound outlet openings 205 are acoustically connected to the sound outlet opening (not shown) of the receiver unit 201 via at least one sound channel within the nozzle.

Figure 2:
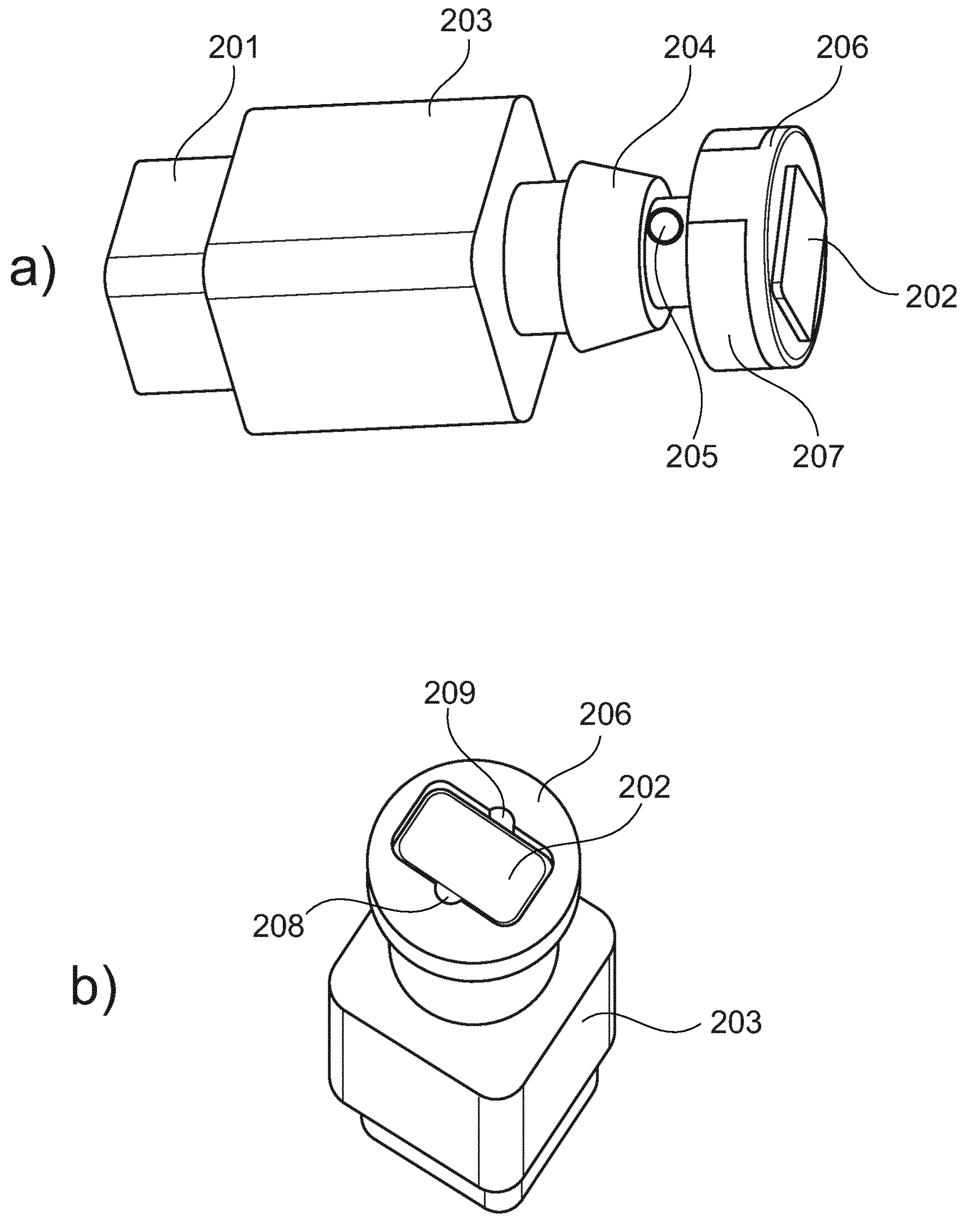
FIG. 2 shows three-dimensional views of an acoustical assembly comprising an in line arrangement of a receiver unit, a nozzle and a microphone unit.
Figure 3:
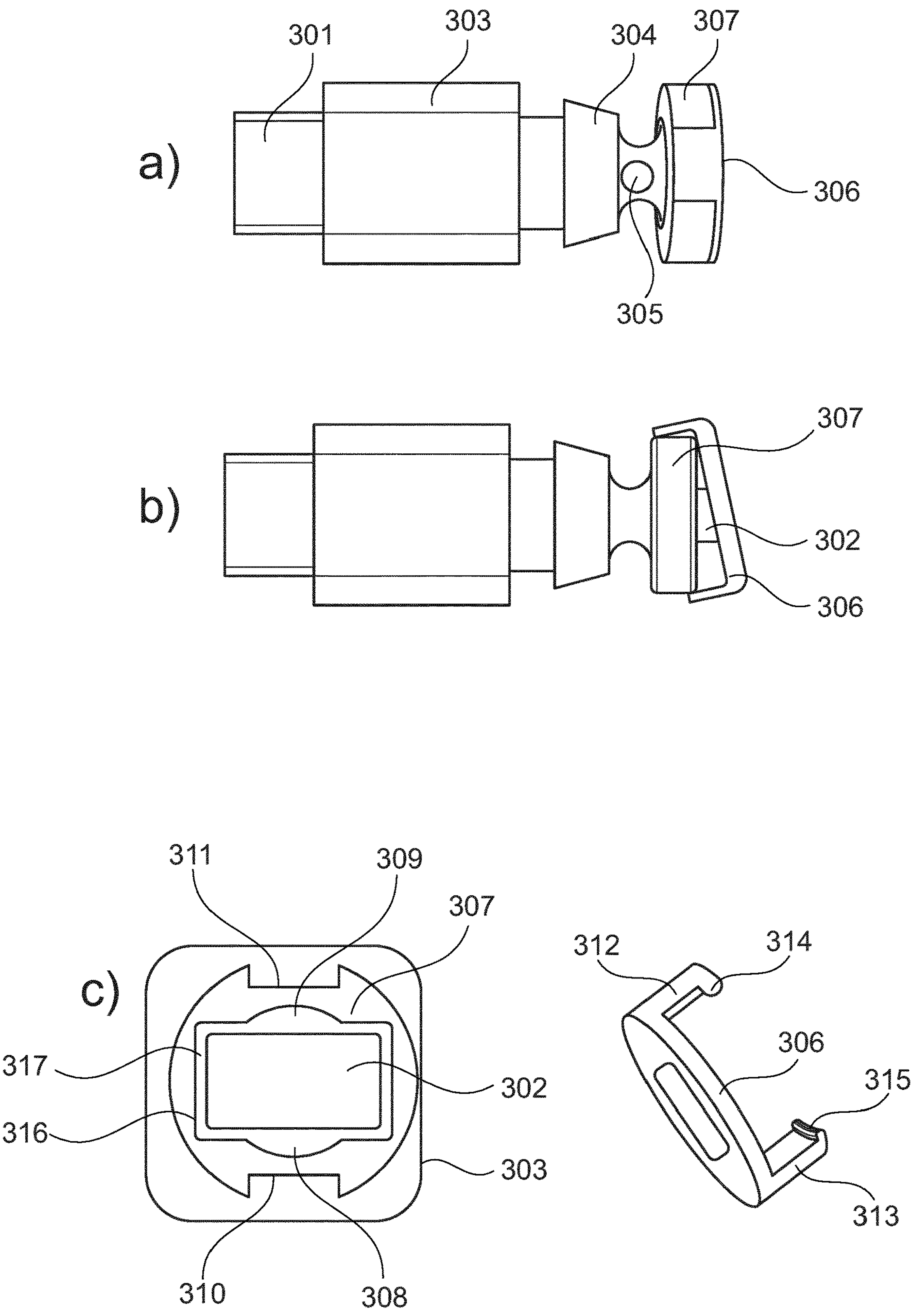
FIG. 3 shows side and top views of an acoustical assembly comprising an in line arrangement of a receiver unit, a nozzle and a microphone unit arranged in line.

Referring now to FIGS. 3*a* and 3*b* two side views of the acoustical assembly of FIGS. 2*a* and 2*b* are depicted. In FIG. 3*b* the acoustical assembly is rotated 90 degrees around a longitudinal axis compared to FIG. 3*a*. Again, the receiver unit 301 is inserted into the first portion 303 of the nozzle, said nozzle further comprising a retaining member 304, oppositely arranged sound outlet openings 305 (only one opening is visible in FIG. 3*a*) and a second portion 307 for housing the microphone unit 302. Similar to FIG. 2, a preferably replaceable wax protection member 306 is secured to the second portion 307 of the nozzle. FIG. 3*c* shows a top view of the acoustical assembly without the wax protection member 306. As seen in FIG. 3*c* the microphone unit 302 is arranged at least partly in an indentation 316 provided in the second portion 307 of the nozzle. A small gap 317 of free space is provided between the microphone unit 302 and the edges of the indentation 316. Moreover, sound channels 308, 309 are provided on both sides of the microphone unit 302 in order to guide incoming sound pressure waves to a sound inlet opening (not shown) of the microphone unit 302. The sound channels 308, 309 are aligned with sound inlet openings 208, 209 of the wax protection member 206, cf. FIG. 2*b*. A pair of oppositely arranged tracks 310, 311 are provided in the second portion 307 of the nozzle. These tracks 310, 311 are adapted to receive respective resilient leg portions 312, 313 of the wax protection member 306. Respective locking arrangements 314, 315 are provided at the ends of the legs portions 312, 313. These locking arrangements 314, 315 are adapted to engage with corresponding locking arrangements (not shown) provided at the ends of the tracks 310, 311 whereby the wax protection member 306 clicks onto the second portion 307 of the nozzle.

Figure 4:
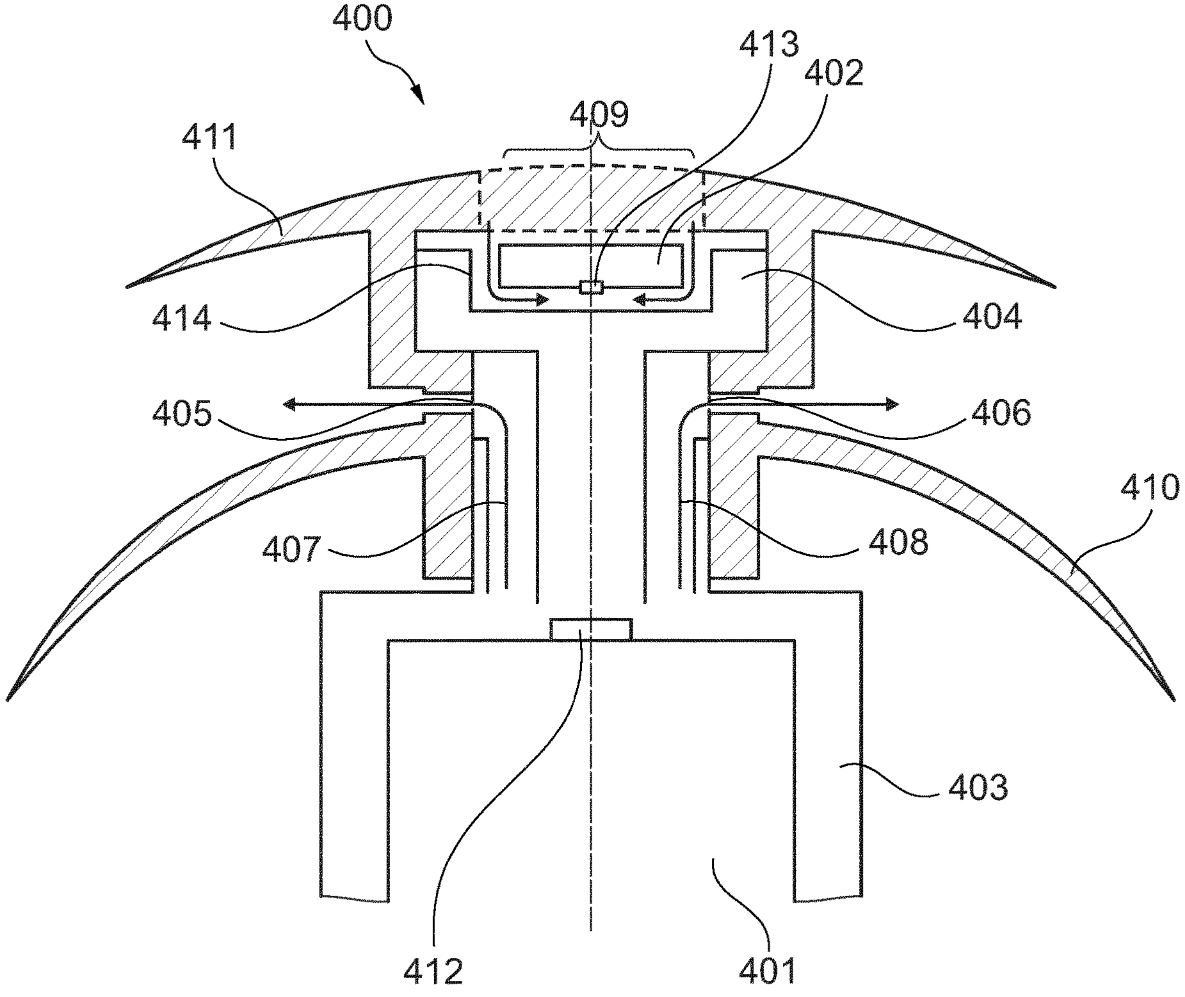
FIG. 4 shows a cross-sectional schematic view of an embodiment of the acoustical assembly comprising a receiver unit, a nozzle having two oppositely arranged sound outlet openings, a microphone unit, a positioning member and a deflection member with a top sound inlet opening for the microphone unit.

FIG. 4 depicts a cross-sectional schematic view of an exemplary embodiment 400 of the acoustical assembly of the present invention. As depicted in FIG. 4 this embodiment comprises an in line arrangement of a receiver unit 401, a nozzle 403, 404 having two oppositely arranged sound outlet openings 405, 406 and a microphone unit 402. Sound pressure waves escaping the sound outlet opening 412 of the receiver unit 401 are guided to the two oppositely arranged sound outlet openings 405, 406 via respective sound channels 407, 408 within the nozzle as indicated by the two arrows. The microphone unit 402 is at least partly arranged in an indentation 414 in the nozzle portion 404 with its sound inlet opening 413 facing the interior of the nozzle in order to prevent that ear wax, moisture or other undesired objects block the sound inlet opening 413 of the microphone unit 402 or damages the microphone unit 402. As indicated by the two arrows around the microphone unit 402 incoming sound pressure waves are allowed to reach the sound inlet opening 413 of the microphone unit 402 via a gap between the microphone unit 402 and the indentation 414. The embodiment depicted in FIG. 4 further comprises a preferably soft and/or flexible dome-shaped positioning member 410 for positioning the acoustical assembly correctly in the ear canal. The positioning member 410 is preferably manufactured of a soft and flexible material, such as silicone, in order to increase comfort for the user while wearing the acoustical assembly. Moreover, a deflection member 411 comprising a sound inlet opening 409 for the microphone unit 402 is provided. As depicted in FIG. 4 the sound inlet opening 409 for the microphone unit 402 is arranged on top of the deflection member 411 thus facing the ear drum when inserted in an ear canal. The deflection member 411 and the positioning member 410 preferably form an integral one-piece moulded structure with sound outlet openings aligned with the corresponding sound outlet openings 405, 406 of the nozzle.

Figure 5:
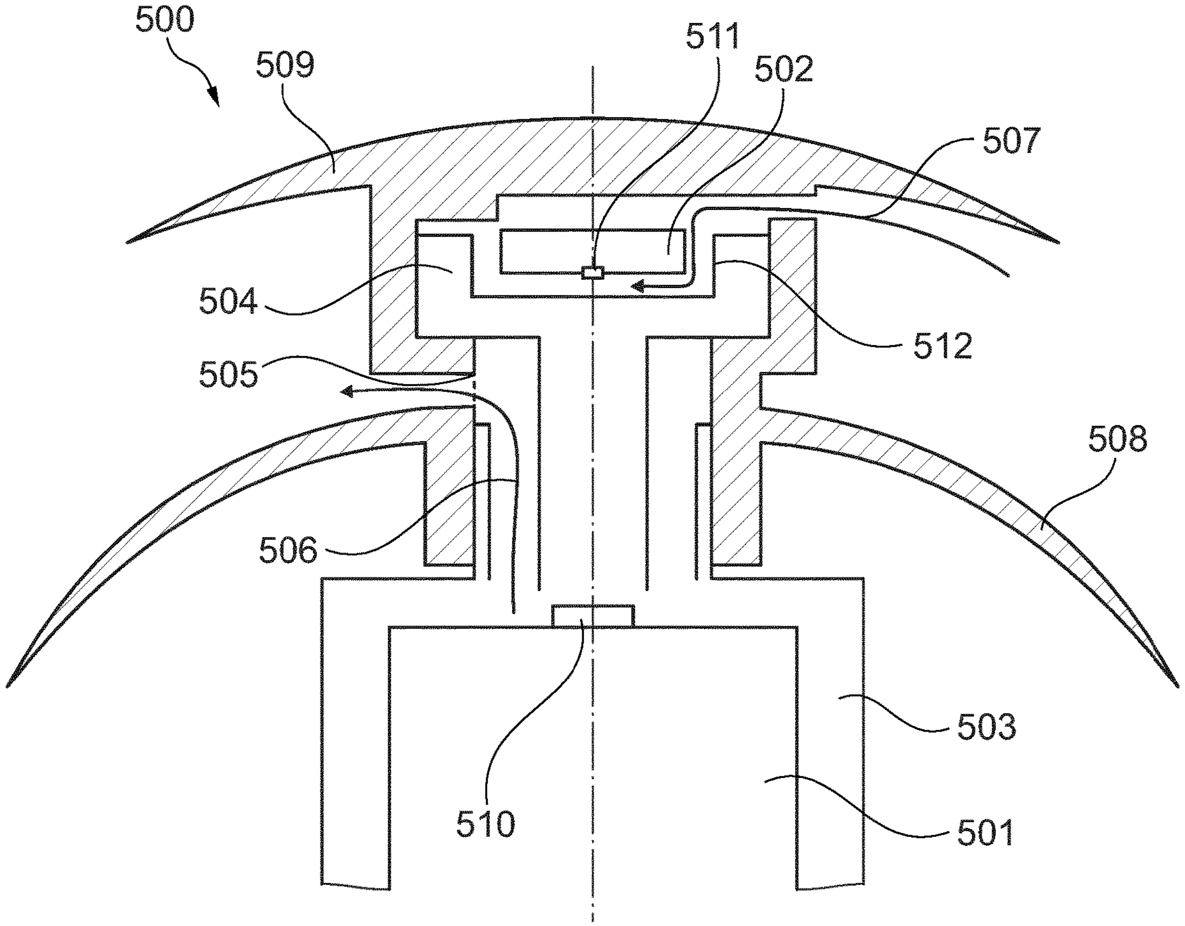
FIG. 5 shows a cross-sectional schematic view of another embodiment of the acoustical assembly comprising a receiver unit, a nozzle having a single sound outlet, a microphone unit, a positioning member and a deflection member with a side sound inlet opening for the microphone unit.

FIG. 5 depicts a cross-sectional schematic view of another exemplary embodiment 500 of the acoustical assembly of the present invention. Similar to the embodiment of FIG. 4 this embodiment also comprises an in line arrangement of a receiver unit 501, a nozzle 503, 504 and a microphone unit 502. In contrast to the embodiment of FIG. 4 the embodiment of FIG. 5 comprises only a single sound outlet opening 505. Again, sound pressure waves escaping the sound outlet opening 510 of the receiver unit 501 are guided to the sound outlet opening 505 via a sound channel 506 within the nozzle as indicated by the arrow. The microphone unit 502 is at least partly arranged in an indentation 512 in the nozzle portion 504 with its sound inlet opening 511 facing the interior of the nozzle in order to prevent that ear wax, moisture or other undesired objects block the sound inlet opening 511 of the microphone unit 502 or damages the microphone unit 502. As indicated by the arrow to the right of the microphone unit 502 incoming sound pressure waves are allowed to reach the sound inlet opening 511 of the microphone unit 502 via a passage in or beneath the deflection member 509 and a gap between the microphone unit 502 and the indentation 512. Similar to the embodiment shown in FIG. 4 the embodiment depicted in FIG. 5 also comprises a preferably soft and flexible dome-shaped positioning member 508 for positioning the acoustical assembly correctly in the ear canal. The positioning member 508 is preferably manufactured of a flexible material, such as silicone, thus increasing the comfort for the user during use. A deflection member 509 is also provided. As depicted in FIG. 5 a sound inlet opening 507 for the microphone unit 502 is provided in or beneath the deflection member 509 as indicated by the arrow. The deflection member 509 and the positioning member 508 preferably form an integral one-piece moulded structure with a sound outlet opening aligned with the opening 505 of the nozzle.

The acoustical assembly of the present invention preferably forms part of a hearing device, i.e. hearing aids/hearables earbuds and the like, to be inserted into the ear canal of the user. The overall dimensions and shape of the acoustical assembly are thus limited in order to comply with such space limited applications.

Although the invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary, the embodiments are merely intended to explain the wording of the appended claims, without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. An acoustical assembly adapted to be inserted into an ear canal, said acoustical assembly comprising:

a receiver unit adapted to generate sound pressure waves, a microphone unit adapted to detect sound pressure waves inside the ear canal when the acoustical assembly is inserted in the ear canal, and a nozzle including a receiver unit mount adapted to house at least part of the receiver unit, wherein the nozzle includes at least one sound channel adapted to guide generated sound pressure waves from a receiver unit outlet opening to at least one sound outlet opening of the nozzle, wherein the nozzle further includes a microphone unit mount adapted to house at least part of the microphone unit, and in that the microphone unit is arranged in the microphone unit mount in such a way that a sound inlet opening of the microphone unit is not oriented towards an ear drum when the acoustical assembly is inserted in the ear canal.

2. The acoustical assembly according to claim 1, wherein the microphone unit is arranged in the microphone unit mount in such a way that the sound inlet opening of the microphone unit is oriented towards an interior portion of the microphone unit mount of the nozzle.

3. The acoustical assembly according to claim 1, wherein the nozzle defines a longitudinal centre axis, and the receiver unit and the microphone unit are arranged symmetrically around, and in line with, said longitudinal centre axis.

4. The acoustical assembly according to claim 1, wherein the microphone unit mount of the nozzle includes an indentation into which indentation the microphone unit is at least partly arranged.

5. The acoustical assembly according to claim 1, wherein the microphone unit mount includes the at least one sound channel, the at least one sound channel adapted to guide sound pressure waves from the ear canal to the sound inlet opening of the microphone unit.

6. The acoustical assembly according to claim 1, further comprising a wax protection member adapted to be attached to the microphone unit mount of the nozzle, the wax protection member further adapted to prevent that ear wax from the ear canal reaches the sound inlet opening of the microphone unit.

7. The acoustical assembly according to claim 6, wherein the wax protection member includes at least one sound inlet opening adapted to be aligned with the at least one sound channel of the microphone unit mount.

8. The acoustical assembly according to claim 1, wherein the at least one sound outlet opening of the nozzle is arranged between the receiver unit mount and the microphone unit mount.

9. The acoustical assembly according to claim 8, wherein a single sound outlet opening of the nozzle is arranged between the receiver unit mount and the microphone unit mount, or in that a pair of oppositely arranged sound outlet of the nozzle are arranged between the receiver unit mount and the microphone unit mount.

10. The acoustical assembly according to claim 1, further comprising a dome-shaped positioning member adapted to ensure correct positioning of the acoustical assembly in the ear canal, wherein the dome-shaped positioning member is attached to the nozzle between the receiver unit mount and the microphone unit mount.

11. The acoustical assembly according to claim 10, further comprising a deflection member at least partly surrounding the microphone unit mount.

12. The acoustical assembly according to claim 11, wherein the dome-shaped positioning member and the deflection member form a one-piece structure of a same material.

13. The acoustical assembly according to claim 12, wherein the one-piece structure includes at least one sound outlet opening aligned with the at least one sound outlet opening of the nozzle, and that the one-piece structure includes at least one sound inlet opening for the microphone unit.

14. The acoustical assembly according to claim 13, wherein the at least one sound inlet opening for the microphone unit is arranged through the deflection member, or that the at least one sound inlet opening for the microphone unit is arranged between the dome-shaped positioning member and the deflection member.

15. A hearing device comprising the acoustical assembly according to claim 1.

* * * * *